May 11, 1954
J. BANNEYER
2,677,868
CLAMPING STRUCTURE FOR FORM APPARATUS
Filed Jan. 18, 1952
2 Sheets-Sheet 1
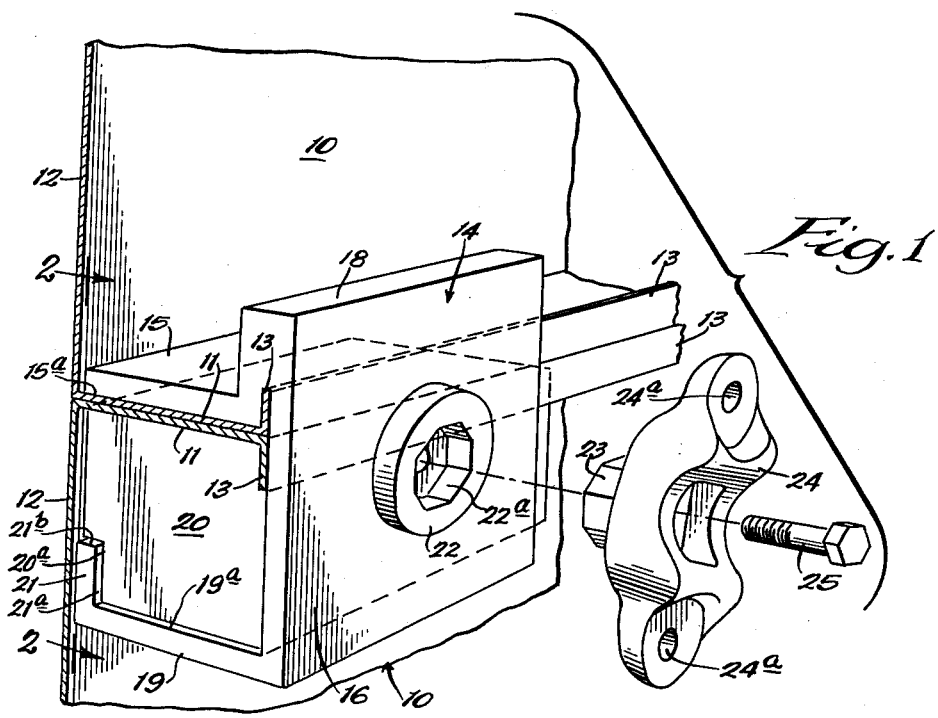
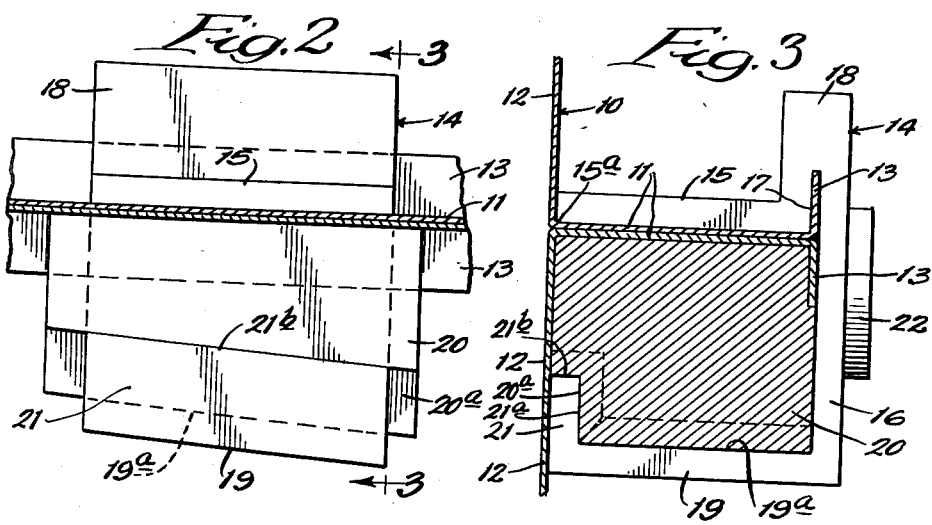
INVENTOR:
Joseph Banneyer,
BY Dawson & Ooms,
ATTORNEYS.

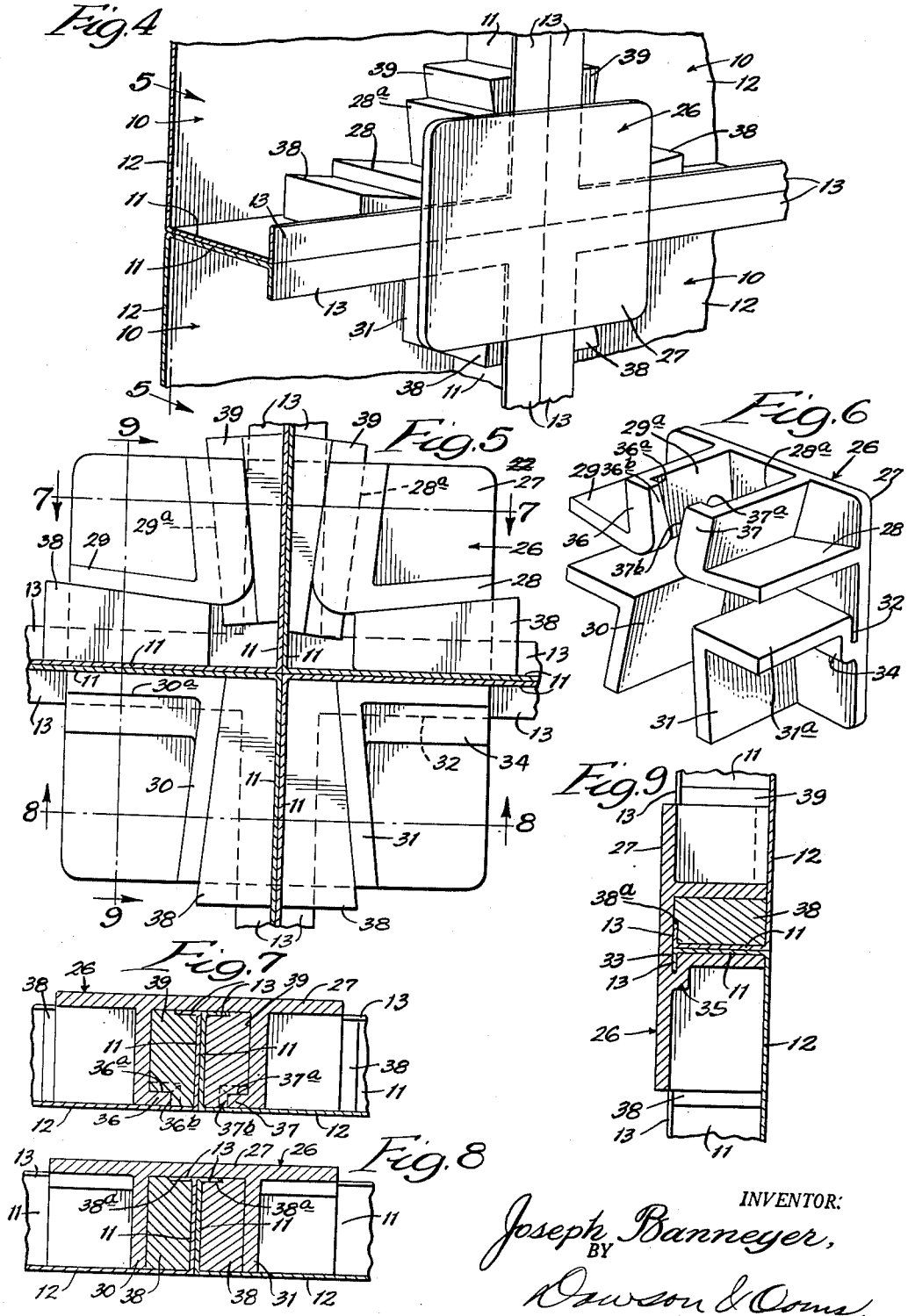

Patented May 11, 1954

2,677,868

UNITED STATES PATENT OFFICE 2,677,868

CLAMPING STRUCTURE FOR FORM APPARATUS

Joseph Banneyer, Chicago, Ill.

Application January 18, 1952, Serial No. 267,177

5 Claims. (Cl. 25—131)

My invention relates to clamping structures for form apparatus. More particularly my invention relates to clamping structures for use with the form apparatus disclosed in my prior application U. S. Serial No. 29,294, filed May 28, 1948, now abandoned. This application is also a continuation-in-part of my co-pending application U. S. Serial No. 222,904, filed April 25, 1951.

In the forming of concrete walls and the like, it is important to assure cheapness of construction that form apparatus be provided which can be quickly set up and taken down. In my abandoned application U. S. Serial No. 29,294, referred to above, I disclose a form apparatus which meets this general need. In this form apparatus the walls or floor as the case may be are formed between or on aligned groups of panels which may be of different shapes and curvatures but which are characterized by having peripheral flanges extending rearwardly and thus providing means for building up the panels one upon the other. The flanges of these panels also preferably terminate in inwardly turned ledges to assist in securing the panels together by various clamping structures. However, the clamping structures which I have heretofore used have suffered from certain disadvantages.

When clamping devices are used such as are shown in my co-pending application identified above, the positioning and removal of the clamps is a relatively time consuming operation since the screws must be turned until tight by means of a wrench or similar tool. Also, it is necessary to hold the panels in correct alignment while clamping, since the clamps do not themselves automatically position the panels. Another objection to the prior clamping structures is that they have to be relatively large and composed of strong materials to withstand any twisting or turning of the panels when the concrete is applied thereto.

In my co-pending application U. S. Serial No. 222,904, referred to above, I disclose a clamping structure for use with a form apparatus of the type described which possesses a considerable number of advantages over previously known clamping structures. One of these advantages is that the clamps permit rapid assembly of the panels since wedges are employed which can be rapidly driven into place. Another advantage is that the clamping structures automatically correctly align the panels as the flanges are clamped together. A still further advantage of the preferred form of this clamping structure is that the clamps are wedged in two directions and all contiguous surfaces of the clamp-frames, wedges and panels are in coacting abutting relationship so as to reinforce each other. However, in the actual use of the clamping structures shown in my co-pending application U. S. Serial No. 222,904 it has been found that the necessity of using two wedges with the simplest form of clamp, which is the one primarily used in assembling the form apparatus, is somewhat of a disadvantage in that additional time is required to drive the second wedge into position, and also there is a tendency for the driving of the second wedge to loosen the first wedge.

Therefore, it is an object of this invention to provide clamping structures possessing all of the advantages of the clamping structures shown in my co-pending application U. S. Serial No. 222,904 while overcoming the disadvantages mentioned above. More specifically, it is an object of my invention to provide a clamp-frame which can be used to secure two panels together while employing only one wedge, and yet cooperating with both of the aligned inwardly turned ledges of the panels in securing the panels together and reinforcing the connection. It is a further object of my invention to provide clamping structures which employ the principle of my improved clamp but which are adapted for securing three or four panels together when arranged to provide a T-junction or a 4-cornered junction.

Further objects and advantages will appear as the specification proceeds.

My invention is shown in an illustrative embodiment in the accompanying drawings in which—

Fig. 1 is a perspective view of the simplest form of my clamping structure showing two panels releasably locked together thereby; Fig. 2, a sectional view of my clamping structure taken on line 2—2 of Fig. 1 showing the taper of the wedge and the inclination of the side plate of the clamp-frame; Fig. 3, a sectional view taken on line 3—3 of Fig. 2 showing the slot between the side plate and the crown plate receiving the panel ledge and indicating in dotted lines the inclination of the inner surface of the clamp-frame side plate and inwardly turned extension secured thereto; Fig. 4, a perspective view of a 4-way clamp, constructed in accordance with the principle of my invention, as used to secure four panels together when aligned to form a 4-cornered junction; Fig. 5, a sectional view taken on line 5—5 of Fig. 4 showing the relationship of the V-shaped plates to the crown plate and to the panel flanges; Fig. 6, a perspective view of the clamp shown in Fig. 4; Fig. 7, a detail sectional view taken on line 7—7 of Fig. 5 showing the double wedging employed in securing one pair of V-shaped plates to the panels; Fig. 8, a detail sectional view taken on line 8—8 of Fig. 5 showing the single wedging employed to lock the panels together between the sides of the V-shaped plates opposite the pair of plates which are wedged in two directions; and Fig. 9, a detail sectional view taken on line 9—9 of Fig. 5 showing the aligned slot between the crown member and the side members within which the ledges are received.

Looking first at Figs. 1 to 3, 10 designates panels which can be of various rectangular shapes. Panels of this type are shown in more detail in my abandoned application U. S. Serial No. 29,294. However, for purposes of this application it is believed to be sufficient to point out that panels 10 are characterized by having peripheral flanges 11 extending rearwardly from imperforate wall-forming fronts 12. Also, flanges 11 terminate in inwardly turned ledges 13. In the illustration given, and preferably panel fronts 12 and ledges 13 are parallel to each other and disposed at right angles to flanges 11. Furthermore, it will be understood that the panels employed in assembling the braced form structure for receiving concrete are usually of the same size so that panel fronts 12 and ledges 13 can be aligned respectively in the same plane with the panel fronts and ledges of other panels.

For the purpose of securing two panels together of the type described, I prefer to employ a clamp-frame or housing 14 of the type illustrated in Figs. 1 to 3. It has been found possible to rapidly construct a strong braced form structure while employing only this simple clamp-frame. However, as will subsequently be described, if desired, clamp-frame 14 can be modified while retaining its essential principles to provide for simultaneously securing three or four panels together at their junctions.

In the illustration given, clamp-frame 14 comprises a side member or plate 15 which has a flat inner surface 15a which is adapted to rest against the inner surfaces of flanges 11. Preferably, side plate 15 is of substantially the same width as the distance between the panel fronts 12 and the inwardly turned ledges 13 so as to abut both the underside of the panel fronts and the underside of the ledges.

A crown member or plate 16 is rigidly secured to the end of side plate 15 adjacent ledges 13. When side member 15 is resting on a flange 11, crown plate 16 is adapted to extend in abutting relation over ledges 13. Preferably, crown plate 16 is at right angles to side plate 15. Between side plate 15 and crown plate 16 there is provided a slot 17 aligned to receive the ledge 13 secured to the flange 11 against which side plate 15 is resting. Preferably, a laterally extending head member 18 is employed to secure side plate 15 to crown plate 16 while providing therebetween the ledge-receiving slot 13. Also, it is desirable that slot 17 be dimensioned to snugly receive ledge 13.

Another side member or plate 19 is rigidly secured to the projecting end of crown member 16 so as to extend laterally from crown member 16 at a spaced distance from side plate 15 and in facing relation therewith. In the illustration given, side plate 19 is thicker at one end than at the other to provide an inner surface 19a which is aligned with inner surface 15a of side plate 15 to provide a wedge-shaped cavity therebetween adapted to receive correspondingly tapered wedge 20 so as to releasably lock panels 10 together in the manner illustrated in Figs. 1 to 3. Preferably, side plate 19 is of substantially the same width as side plate 15 and is provided at the end adjacent panel front 12 with an inwardly turned extension or tip 21. Preferably, extension 21 increases in thickness from one end to the other in the same direction as side plate 19 so that its side surface 21a is inclined with respect to ledge 13. Also, it is preferred that the end surface 21b be inclined with respect to surface 15a of side plate 15 to correspond to the inclination of surface 19a, as seen more clearly in Fig. 2. When side plate 19 is equipped with tapered extension 21, wedge 20 is notched at corner 20a to provide tapered surfaces corresponding to surfaces 21a and 21b. Thus, in the preferred form of my clamp-frame 14 and of correspondingly notched and tapered wedge 20 panels 10 are releasably locked together by a double-wedging action, side plate 19, flanges 11 and side plate 15 being wedged in one direction by wedge 20 while ledge 13 is wedged against extension 21 in the other direction by wedge 20.

As explained in detail in my abandoned application U. S. Serial No. 29,294 it is desirable to employ means on at least some of the clamps for securing the clamps to pipes or other bracing elements to assist in supporting the form apparatus when the concrete is poured into it. Any suitable means can be provided to accomplish this purpose. For example, in Fig. 1 there is shown mounted on the outer surface of crown 14 a socket 22 having a hexagonal lug 23 projecting from pipe receiving arm 24. Hexagonal lug 23 can be secured within recess 22a by any suitable means such as bolt 25. It will be understood that another pipe receiving arm or clamp member adapted to mate with arm 24 can be fastened around a pipe held in the central portion of arm 24 and fastened to arm 24 by means of bolts, etc. through apertures 24a. All of this structure is well shown in my abandoned application 29,294, and therefore it is believed that it will not be necessary to further describe it herein.

As previously indicated, clamp-frame 14 can be modified while retaining its essential principles to provide for simultaneously securing three or four panels together at their junctions. Such a modification is illustrated in Figs. 4 to 9. As shown more clearly in Fig. 4, four rectangular panels 10 are brought together and aligned to form a four-cornered junction. Panels 10 are of the same type as those previously described in connection with clamp-frame 14 having abutting flanges 11 extending rearwardly from their aligned wall-forming fronts 12 and terminating in aligned inwardly turned ledges 13.

When four panels 10 are brought together to form a 4-cornered junction as illustrated in Fig. 4, a clamp-frame 26 can be employed to simultaneously secure these panels together at their junction. In the illustration given, clamp-frame 26 comprises a crown plate 27 adapted to rest on the outer surfaces of ledges 13 extending over the 4-cornered junction and beyond the ledges. To the underside of crown plate 26 there are secured four V-shaped plates 28, 29, 30 and 31 in a generally symmetrical arrangement with their corners inwardmost and in spaced-apart relation so that one of the V-shaped plates extends within each of the panels 10 when crown plate 26 is resting on ledges 13 over the 4-cornered junction. Preferably, all of the V-shaped plates 28, 29, 30 and 31 have their sides aligned with respect to each other to provide wedge-shaped cavities between the sides of the plates. Also, it is important that one adjacent pair of plates 30a and 31a have their inner surfaces lying in substantially the same plane so that each of their inner surfaces is adapted to rest against the surfaces of flanges 11 between ledges 13 and panel fronts 12. Preferably plates 30a and 31a are substantially the same width as the distances between panel fronts 12 and ledges 13 so as to abut both the undersides of the panel fronts and the undersides of the ledges.

Between side plates 30a and 31a and crown plate 26 there is provided slots 32 and 33, as seen more clearly in Figs. 6 and 9. Slots 32 and 33 are aligned to receive the corresponding ledges 13 secured to the flanges 11 against which side plates 30a and 31a are resting. Preferably, laterally extending head members 34 and 35 are employed to secure side plates 30a and 31a to crown plate 26 while providing therebetween the ledge-receiving slots 32 and 33. Also, it is desirable that slots 32 and 33 be dimensioned to snugly receive ledges 13.

As in clamp-frame 14, clamp-frame 26 is constructed so that the double-wedging securing means is employed opposite the slot and ledge securing means. In the illustration given, this is accomplished by providing sides 28a and 29a of the V-shaped plates opposite the pair of plates 30 and 31 with inwardly turned extensions or tips 36 and 37 to secure their bottom edges. It will be noted that sides 28a and 29a are adapted to face the panel flanges 11 which are at right angles to the flanges abutting the pair of sides 30a and 31a. Preferably, extensions 36 and 37 increase in thickness from one end to the other in the same direction as the inward taper of the cavity between sides 28a and 29a so that their inside surfaces 36a and 37a are inclined with respect to crown plate 26, and therefore with respect to ledges 13. Also, it is preferred that end surfaces 36b and 37b be inclined in the same direction as sides 28a and 29a.

In releasably locking the panels together with clamp-frame 26, six wedges are required. Four of these wedges 38 are tapered only in one direction, as seen more clearly in Figs. 4, 8, and 9. However, wedges 38 can be provided with a shallow groove 38a to receive ledges 13. The other two wedges are of the same type as wedge 20, previously described for use in clamp-frame 14. These two wedges 39 are tapered in two directions and are notched at one corner to receive extensions 36 and 37. Thus, as previously described, this structure accomplishes a double-wedging action by wedging side plates 28a and 29a against flanges 11 and extensions 36 and 37 against ledges 13.

The operation of the clamp-frames in releasably locking panels 10 together has already been indicated in considerable detail. Preferably, panels 10 are brought together in abutting relation and the clamp-frames such as clamp-frames 14 and 26 are applied so as to straddle flanges 11 and the wedge blocks such as blocks 20, 38, and 39 are forced into place. This can conveniently be done by the use of a hammer or mallet, whereby the wedges can be rapidly driven into correct position. Thus, speedy assembly of the panel structure is accomplished. Similarly, the wedges can be easily removed by striking them on the opposite end so that they will be disengaged from the clamp-frames.

While in the foregoing specification, I have set forth structures in great detail for the purpose of illustrating embodiments of my invention, it will be understood that such details of structure may be varied widely by those skilled in the art without departing from the spirit of my invention.

I claim:

1. A clamp-frame for use in releasably locking two panels together having abutting flanges extending rearwardly from their wall-forming fronts and terminating in inwardly turned ledges, comprising a side plate adapted to rest against one of said flanges between said ledge and said panel front, a crown plate rigidly secured to the end of said side plate adjacent said ledges when said side plate is positioned against said flange and adapted to extend in abutting relation over said ledges, said side plate and said crown plate having a slot therebetween aligned to receive the ledge secured to the flange against which said side plate is adapted to rest, and another side plate secured to said crown plate and extending laterally therefrom at a spaced distance from said first-mentioned side plate and in facing relation therewith, said second-mentioned side plate being aligned with said first-mentioned side plate to provide a wedge-shaped cavity therebetween, said second-mentioned side plate terminating in an inwardly-turned extension providing a side surface inclined with respect to said panel ledges when said crown plate is seated thereon.

2. A clamp-frame for use in releasably locking two panels together having abutting flanges extending rearwardly from their aligned wall-forming fronts and terminating in aligned inwardly turned ledges, comprising a side plate of substantially the same width as said flanges adapted to rest against one of said flanges between said ledge and said panel front, a crown plate rigidly secured to the end of said side plate adjacent said ledges when said side plate is positioned against said flange and adapted to extend in abutting relation over said ledges, said side member and said crown member having a slot therebetween dimensioned and aligned to snugly receive the ledge secured to the flange against which said side plate is adapted to rest, and another side plate secured to said crown plate and extending laterally therefrom for substantially the same distance as said first-mentioned side plate and at a spaced distance therefrom and in facing relation therewith, the inner surface of said second-mentioned side plate being aligned with the inner surface of said first-mentioned side plate to provide a wedge-shaped cavity therebetween, said second-mentioned side plate terminating in an inwardly-turned extension providing a side surface inclined with respect to said panel ledges when said crown plate is seated thereon.

3. In a braced form structure for receiving concrete, the combination of two panels in said form having aligned wall-forming fronts joined to outwardly turned peripheral flanges lying in abutting relation and terminating in aligned inwardly turned ledges, a clamp-frame straddling said abutting flanges, comprising a lengthy side plate resting against one of said flanges in a non-tilting relation therewith and extending for substantially the entire distance between said ledge and said panel front, a crown plate rigidly secured to the end of said side plate adjacent said ledges and extending in abutting relation over said ledges, said side plate and said crown member having a slot therebetween snugly receiving the adjacent ledge, and another side plate secured to said crown plate and extending laterally therefrom toward said panel front at a spaced distance from said first-mentioned side member and aligned with respect to the adjacent panel flange to provide a wedge-shaped cavity therebetween, said last-mentioned side plate having its inner end substantially abutting the panel front, and a tapered wedge positioned within said wedge-shaped cavity for releasably locking said panels together.

4. The structure of claim 3 in which said second-mentioned side plate terminates in an inward extension providing an inclined inner surface against which said wedge abuts so as to wedge said surface against the adjacent ledge.

5. A clamp-frame for use in releasably locking four rectangular panels together when aligned to form a 4-cornered junction, said panels having abutting flanges extending rearwardly from their aligned wall-forming fronts and terminating in aligned inwardly turned ledges, comprising a crown plate adapted to rest on the outer surfaces of said ledges over said 4-cornered junction, and four V-shaped plates secured in a generally symmetrical arrangement with their corners inwardmost to the underside of said crown plate in spaced-apart relation so that one of said V-shaped plates extends within each of said panels when said crown plate is resting on said ledges, all of said V-shaped plates being aligned with respect to each other to provide wedge-shaped cavities therebetween, one adjacent pair of said plates having sides lying in substantially the same plane and adapted to rest against said panel flanges between said ledges and said panel fronts, said sides lying in the same plane and said crown plate having slots therebetween aligned to receive said ledges, the other adjacent pair of V-shaped plates having inwardly turned extensions secured to the bottom edges of the sides facing the panel flanges at right angles to the flanges abutting the sides of the first-mentioned pair of sides lying in the same plane, said inwardly turned extensions providing inner surfaces inclined with respect to said crown plate.

References Cited in the file of this patent

UNITED STATES PATENTS

| Number | Name | Date |
| --- | --- | --- |
| 1,032,419 | Morrill | July 16, 1912 |
| 1,250,032 | Schub | Dec. 11, 1917 |
| 1,898,319 | Soule | Feb. 21, 1933 |